United States Patent
Huschke et al.

(10) Patent No.: US 8,254,280 B2
(45) Date of Patent: Aug. 28, 2012

(54) METHOD AND APPARATUS FOR COMPOSING A SET OF CELLS IN A RADIO NETWORK

(75) Inventors: Jörg Huschke, Aachen (DE); Shyam Chakraborty, Londonderry (GB)

(73) Assignee: Telefonatiebolaget L M Ericsson (Publ), Stockholm (SE)

( * ) Notice: Subject to any disclaimer, the term of this patent is extended or adjusted under 35 U.S.C. 154(b) by 278 days.

(21) Appl. No.: 12/526,582

(22) PCT Filed: Dec. 13, 2007

(86) PCT No.: PCT/EP2007/010951
§ 371 (c)(1),
(2), (4) Date: Feb. 10, 2010

(87) PCT Pub. No.: WO2008/095523
PCT Pub. Date: Aug. 14, 2008

(65) Prior Publication Data
US 2010/0142492 A1 Jun. 10, 2010

(30) Foreign Application Priority Data
Feb. 9, 2007 (EP) .................................... 07002864

(51) Int. Cl.
*H04J 1/16* (2006.01)
*H04L 12/56* (2006.01)
(52) U.S. Cl. ............. 370/252; 370/329; 370/389; 455/1
(58) Field of Classification Search .................. 370/252, 370/329, 389; 455/1
See application file for complete search history.

(56) References Cited

U.S. PATENT DOCUMENTS
5,862,488 A * 1/1999 Kotzin et al. ................. 455/510
2001/0034236 A1* 10/2001 Tong et al. .................... 455/450
* cited by examiner

*Primary Examiner* — John Pezzlo
(74) *Attorney, Agent, or Firm* — Roger S. Burleigh (57) ABSTRACT

The invention proposes a method for enabling a composing of a set of cells within a coverage area of a radio access network within which the same information is transmitted time synchronously using a modulation and coding scheme common for the cells of the set. The proposed method comprises the following steps performed by a mobile station connectable to the radio access network: identifying one or more pilot signals from respective one or more cells monitored by the mobile station, determining signal and interference contributions from the one or more monitored cells with regard to a particular set of cells, reporting the determined signal and interference contributions towards a network node performing the composition of the set of cells.

13 Claims, 5 Drawing Sheets

METHOD AND APPARATUS FOR COMPOSING A SET OF CELLS IN A RADIO NETWORK

TECHNICAL FIELD

The invention relates to the field of radio access networks and in particular to a composition of a set of cells within the radio access network.

BACKGROUND

The 3GPP (third generation partnership program) is a consortium that is commissioned with the task of standardising cellular telecommunication networks.

Recently in the 3GPP consortium the long-term evolution of the UTRAN (UMTS (Universal Mobile Telecommunication System) Terrestrial Radio Access Network) has become work item that is focussed on. This UTRAN long term evolution work is known as LTE. Among the topics of the LTE work is the configuration of radio access networks for different kinds of network services and in particular the development of tailored modulation schemes for providing such kinds of services. A modulation type recently considered in LTE for the physical layer is OFDM (orthogonal frequency division multiplexing), in that orthogonal signals are synchronised and modulated on neighbouring (sub-) carriers. It is foreseen to apply this modulation scheme also for the transmission of MBMS (multimedia broadcast/multicast services).

For the provision of MBMS services it is furthermore considered to apply transmission scheme in that the same information is transmitted time synchronously using a modulation and coding scheme common for a plurality of cells within a cellular radio access network. Such a radio network comprising a plurality of cells in that a common modulation and coding scheme is applied for a synchronous transmission within the various cells is known as SFN (single frequency network). Within an SFN, a mobile station is normally located within the coverage area of more than one cell, or with other words covered by more than one eNB (evolved Node B). By this a constructive superposition of signals from neighbouring cells can be utilised to achieve a sufficient signal level at a receiving mobile station.

For the provision of an MBMS service one or a plurality of SFNs can be applied, advantageously augmented with one or more isolated cells.

The configuration of an SFN service can be either static or dynamic. In a static SFN, termed SSFN, the SFN can only be reconfigured, e.g. by adding and/or removing cells from the SFN by applying operation and maintenance commands to configure the SFN on a long term basis. Any short term user activity cannot be considered in a SSFN and any consideration of radio conditions has to be an the level of network planning.

To overcome this drawback, a more dynamic configuration of network has been proposed. However a clear concept for this has not been established yet.

DETAILED DESCRIPTION OF THE DRAWINGS

In the following section the invention is described in more detail by means of embodiments and figures. Equal reference signs indicate equal elements.

Figure 1:
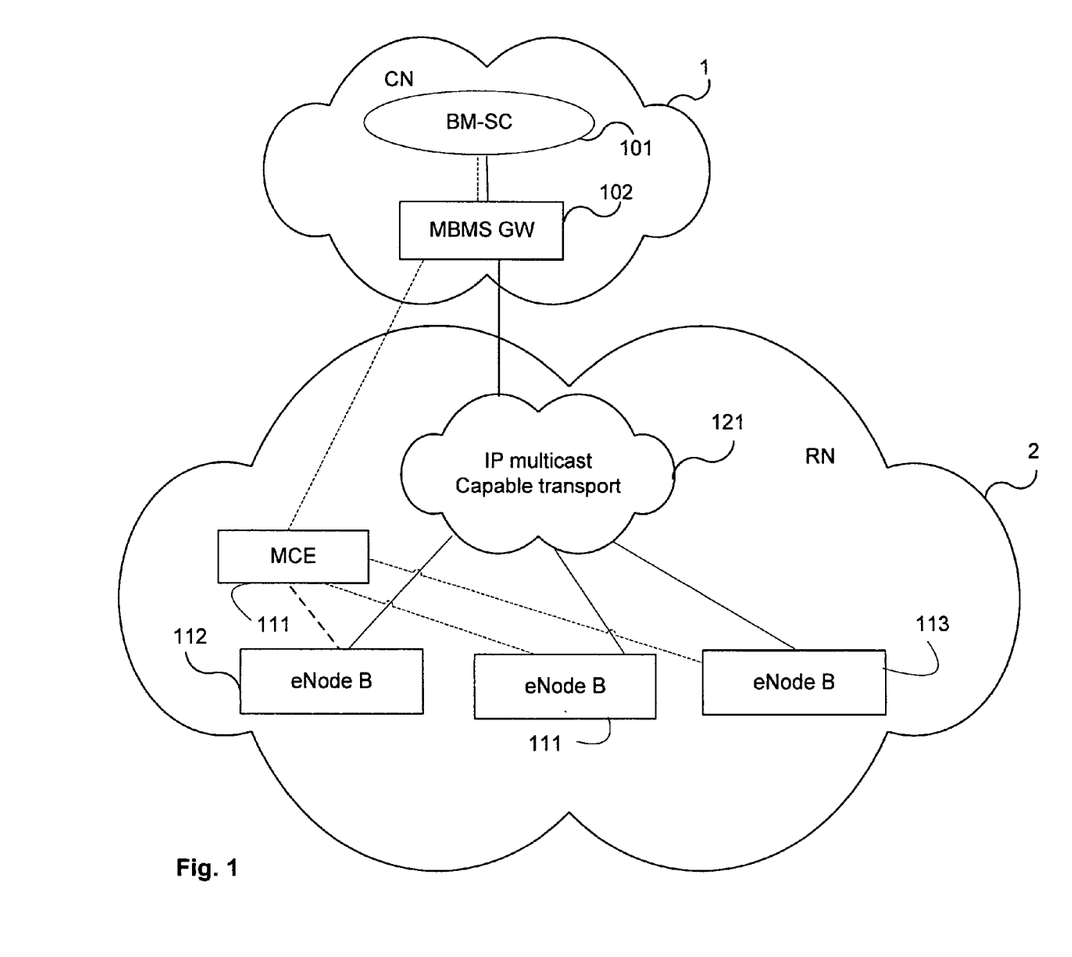
FIG. 1 depicts a network architecture comprising a core network and a radio access network which can be applied in accordance with the teachings of the current invention.

FIG. 1 depicts a network architecture of mobile network comprising a radio access network 2 and core network 1 that can be advantageously applied in the context of the present invention. The core network depicted in FIG. 1 comprises a BM-SC (broadcast multicast service centre) 101 for providing multimedia services and multimedia content via broadcast and multicast transmission technologies to a plurality of mobile stations served within the service area of the mobile network, which is termed MBMS (multimedia broadcast/multicast service) service area.

Furthermore the core network 1 comprises and an MBMS GW (multimedia broadcast/multicast service gateway) 102 interfacing with the BM-SC 101 and with a radio access network e.g. a radio access network in accordance with the long term evolution of UMTS.

In particular the MBMS GW 102 interfaces via an interface with a transport network 121, comprising means for providing multicast transport mechanisms such as specific tree structured topologies for routing and duplicating the multimedia data.

The transport network 121 of the radio access network 2 interfaces with the base stations of the radio access network 2, exemplified by a first base station 112, a second base station 111, and a third base station 113, which can be eNBs (evolved Node Bs), in the context of a LTE UMTS radio access network. The service area covered by the radio access network is divided into a plurality of cells, as is known to the person skilled in the art. Each of the cells of the radio access network is served by one or more associated bases stations. Traditionally, for applying unicast transmission, a mobile station is served within the radio network by a single base station applying a modulation and coding scheme which is unique within the cell and which different from the modulation and coding schemes applied within the cells adjacent to the cell the mobile station is currently located in.

In broadcast and/or multicast transmission a common modulation and coding scheme is applied for transmitting a common content to a plurality of mobile stations.

According to the single frequency network concept, a common modulation and coding scheme is utilized for transmitting the same information synchronously within a plurality of cells using a plurality of associated base stations. To that end methods of time and frame synchronisation between the base stations are provided that are known to the person skilled in the art.

The cells of the radio access network, in that a common modulation and coding scheme is applied, as described above form a subarea of the MBMS service area and is termed a SFN (single frequency network).

In accordance with the teachings of the present invention a MCE (multicast control entity) 122 is provided that interfaces with the MBMS GW 102 and with the bases stations 112, 111. To control the provision of MBMS services the MCE 111 controls the allocation of resources such as modulation and coding schemes, carriers and so on within the base stations of the radio access network 112, 111, 113 of the radio network. In particular the MCE 111 controls the resource allocation and configuration within base stations 112, 111, 113 of the radio access network to dynamically form a single frequency network. To that end a single frequency network may be reconfigured at periodic intervals, depending upon the activity and mobility of the mobile stations which are served within the coverage area of the radio access network.

The MBMS service area may be fully covered by a single SFN, or a plurality of SFNs may be configured to serve the mobile stations to provide an MBMS service. If needed single cells may be configured to provide the MBMS service in addition to the one or more SFNs. The dynamic configuration of the SFNs may result in the addition and/or removing of cells to a radio network at periodic intervals. A result of the reconfiguration may also be that SFNs are merged, i.e. that previously unsynchronised groups cells of the different SFNs in that different coding and/or modulation schemes have been used are switched to a mode of operation, in that these cells are synchronized and apply a common modulation and coding scheme.

Information from the mobile stations within the coverage area of the radio network 2 that regard the radio conditions within the radio network 2 are provided to the MCE 122. In particular said information on radio conditions relate to signal and/or interference level that may influence an establishing of a single frequency network or a reconfiguration of an established single frequency network.

To that end the bases stations 112, 111, 113 of the radio network provide predefined pilot signals that are received by the mobile stations within the coverage area of the mobile network. The pilot signals are identified and measured to obtain signal and/or interference level measurements in the mobile stations. The mobile stations may determine secondary values from the signal and/or interference levels, e.g. a modulation and coding scheme selectable in view of the determined signal and/or interference levels. The mobile stations report the signal and/or interference level measurements or the determined modulation and coding schemes in measurement reports back to the MCE 111.

The MCE 111 considers the measurement reports when configuring the single frequency networks.

Figure 2:
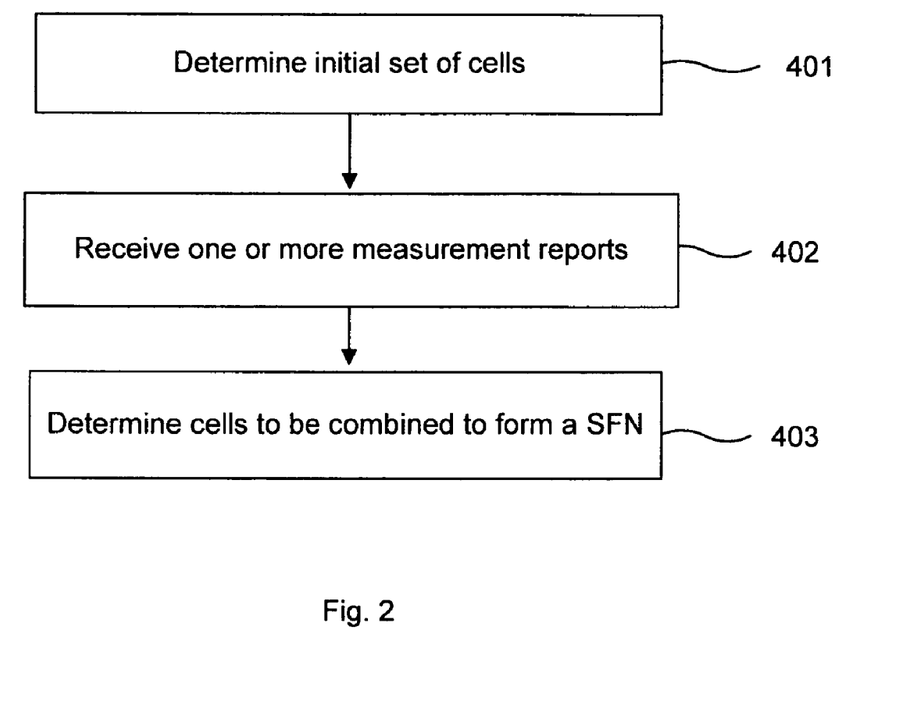
FIG. 2 depicts a flow chart diagram depicting a method of composing a set of cells for a single frequency network.

FIG. 2 is a flow chart diagram illustrating a method for composing a set of cells in accordance with the teachings of the present invention. The method depicted in FIG. 2 can preferably be performed in connection with the MCE (multicast control entity) for controlling radio resource usage within a radio access network such as the MCE depicted in FIG. 6.

On a general level, for any mobile station to be provided with the MBMS service, an initial set of cells is determined in processing step 401.

In a subsequent processing step 402 the MCE (multicast control entity) receives one or more reports from the mobile stations to be served that comprise or are based on signal and/or interference contributions from one or more cells monitored at the one or more mobile stations in relation to a reference set of cells, which may be the initial set. To deliver a report the mobile station may utilize channel state information.

According to the signal and interference contributions received from the mobile stations to be served, the MCE determines one or more sets of cells to be combined to form a single frequency network in a processing step 403.

When a mobile stations roams within the service area of the radio access network the cells for that the interference and/or signal contributions are reported may change. Furthermore, in response to the reports received from the mobile stations the single frequency network may be reconfigured.

Figure 3:
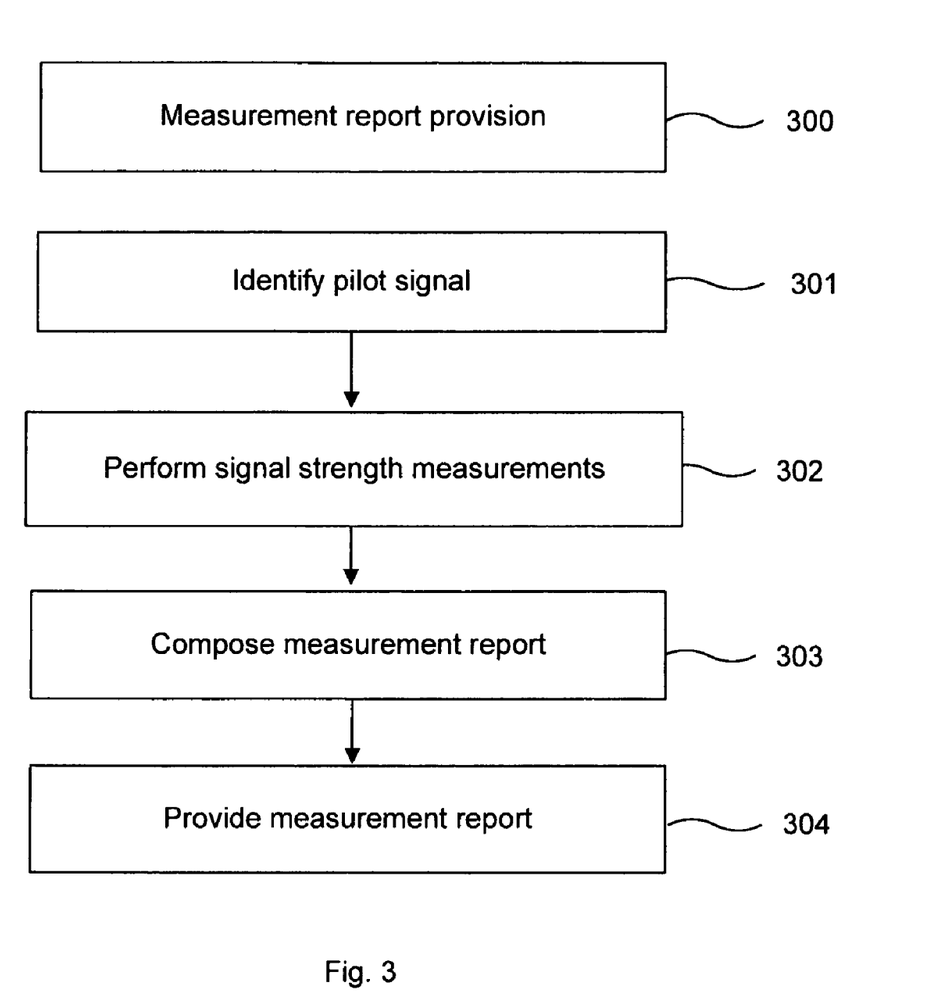
FIG. 3 depicts a flow hart diagram depicting a method of reporting measurements enabling a composing of a single frequency network.

FIG. 3 is a flow chart diagram illustrating a method 300 in a mobile station in accordance with the teachings of the present invention. When performing the method 300 depicted in FIG. 3, the mobile station may be roaming within the coverage area of the radio access network depicted in FIG. 1.

Starting with step 301 the mobile station identifies one or more pilot signals from respective one or more cells monitored by the mobile station. Continuing with step 302 the mobile station performs signal strength measurements, which advantageously comprise measurements of potential contributions to signal and/or interference levels from a particular cell, which is received at a mobile station.

In a subsequent step 303 the signal and/or interference levels measured in the mobile station are used to compose a measurement report that is provided step 304 towards a network node, performing a composition of the set of cells to be comprised within a single frequency network. The measured signal and/or interference contributions may either be reported as an indication indicating the signal and/or interference level directly, or secondary values may be derived from the measured signal and interference contributions, such as a signal to noise ratio, a signal to interference ratio, or a signal to interference and noise ratio. Such a secondary indicator may also include a modulation and coding scheme which is selectable in view of the measured signal and/or interference level.

In the context of the invention the following measurement and reporting schemes can advantageously applied:

The mobile station can measure the signal strength of a pilot signal from all neighbouring cells adjacent to the cell in that the mobile station is currently roaming. The signal strength measurements from the neighbouring cells may include signal delays measured with respect to a reference signal, which may be a pilot signal of a reference cell which may be e.g. the cell in that the mobile station is currently located.

The following reporting schemes are conceivable:

The mobile station reports, for each cell from which pilot signals are received, or from a selected subset of the cells, the received signal strength of the pilot signal and the delay of the pilot signal relative to the pilot signal of a reference cell.

In another embodiment the mobile station reports for each or a subset of the cells from which pilot signals are received an estimated contribution of the particular cell to the signal level and an estimated contribution of the particular cell to the interference level.

Alternatively to reporting the contribution to the signal level and the contribution to the interference level, the mobile station may report a single value, which is the larger of the contribution to useful signal level and the contribution to the interference level, together with an indication, advantageously represented by a single bit, indicating whether the signal level or the interference level is reported.

According to a preferred embodiment the mobile station reports an ordered list of a plurality of measurement values representing measurements from various cells, wherein the list is sorted with respect to the relevance of the signal/and or interference contribution of the respective cell.

For example the sorting could be in the order of an increasing carrier to interference and noise ratio.

The measurements may be made under the assumption that a subset of cells is combined to form a set of cells of a single frequency network as described above.

To that end the mobile station may receive indications whether one or more cells have been included in the set of cells of the single frequency network.

Alternatively or in addition the mobile station may consider the measurements to determine, which cells could be advantageously included in the set of cells to be combined to the single frequency network.

To that end the mobile station may compose a list of cells potentially included in the set of cells and sorted with regard to a potential influence to the signal and/or interference level, and include a potential increase to the signal and/or interference level, if the cell would be included into the set of cells, wherein the signal and interference contributions from the preceding cells are considered.

Alternatively or in addition the mobile station may determine a modulation and coding scheme selectable in view of the measured signal and/or interference level, e.g. a signal and/and interference level achievable when one or more particular cells are included in the set of cells and report the selectable modulation and coding scheme, preferably together with an indication of the potentially included one or more cells.

According to a preferred embodiment, the mobile station only reports measurement values that consider a subset of the set of cells from which pilot signals can be received in the mobile station. To that end the mobile station may be instructed to report measurements form a limited number of cells, an instruction to that end preferably including an indication of the number of cells that should be considered in the report.

As an example the mobile station can include only those cells in the report that would improve the selectable modulation and coding schemes, if those cells were included in the set of cells of the signal frequency network.

In a preferred embodiment a potential improvement of the selectable modulation and coding scheme could be specified, e.g. considering the achievable transmission rate associated with a transmission using the respective modulation and coding scheme. In that context the instruction to the mobile station could be that an improvement of the transmission rate above a certain rate is not necessary, and this particular rate could be included in an instruction to the mobile station.

According to an alternative embodiment the mobile station may receive indications whether one or more cells have been included in the set of cells of the single frequency network and determines a set of cells currently included in the set of cells of the single frequency network. In that context a measured signal and/or interference contribution from a particular cell included in the set of cells may be expressed with regard to the set of currently included cells, e.g. as a potential decrease of the signal level or a potential increase of the interference level, if the particular cell would be removed form the set of cells. Alternatively the measured signal and/or interference contribution from a particular cell that is currently not included in the set of cells may be expressed with regard to the set of currently included cells, e.g. as a potential increase of the signal level or a potential decrease of the interference level, if the particular cell would be included in the set of cells.

In that context only the least significantly contributing cells could considered in the report from the mobile station.

In that context either an indication of the number of cells to be reported can be received by a mobile station, or a potential degradation of the selectable modulation and coding scheme could be specified, e.g. considering the achievable transmission rate associated with a transmission using the respective modulation and coding scheme. In that context the instruction to the mobile station could be that a degradation of the transmission rate to a certain level should be considered in the report, and this particular rate could be included in an instruction to the mobile station.

By this the number of cells considered in the report can be reduced, and a mobile station for that the current signal or signal to interference and/or noise level is above the respective required level would not need to send a report.

Alternatively or in addition the mobile station may receive an instruction instructing the mobile station to report signal and/or interference measurements considering a set of cells indicated in the instruction. By this the number of cells considered in the reports can be limited. Preferably the set of cells should comprise cells situated at the border of the SFN, i.e. cells extending outside the border of the SFN as well as cells adjacent to the border at the inner side of the border.

By this the reports from the mobile station can be limited to include only those cells from the set that affect the signal and/or interference level significantly. Also the mobile stations in the inner region of the set of cells, which are further away from the border of the SFN can be excluded from the report, thus saving signalling resources required for the transmission of the reports.

Some of the above described methods are based on a set of cells considered in the measurements within the mobile stations and in particular the set of cells currently combined for a SFN that has been formed. To achieve consistency between the set of cells considered by the mobile stations and the MCE different methods are provided. According to a first method, the MCE broadcasts a complete list of cells when a SFN has been formed, and advantageously subsequently at periodic intervals. Changes in the set of cells are considered by broadcasting recently removed or at added cells from the MCE to the mobile stations, when the set of cells of the SFN is updated. Alternatively within each cell a list of indications of SFNs served by the particular cell is broadcasted to the mobile stations within the coverage area of the respective cell. By combining indications received from the various cells, a mobile station is enabled to compose the set of cells of a certain SFN.

Continuing with the description of FIG. 4 a method 500 will be described that can be advantageously applied to determine a set of cells that form a single frequency network.

Figure 4:
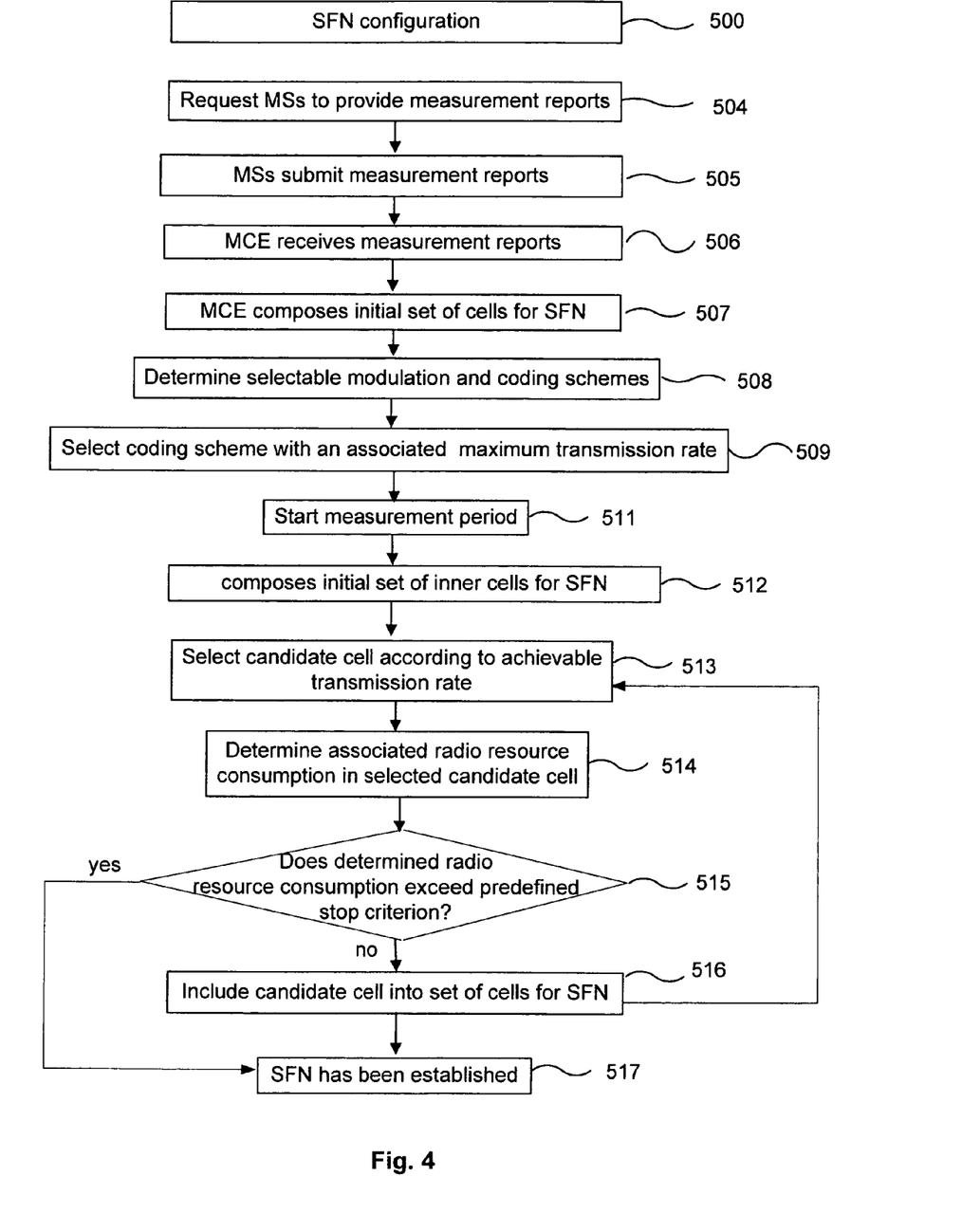
FIG. 4 is a flow chart diagram illustrating a method in a mobile network node in accordance with the teachings of the present invention.
Figure 5:
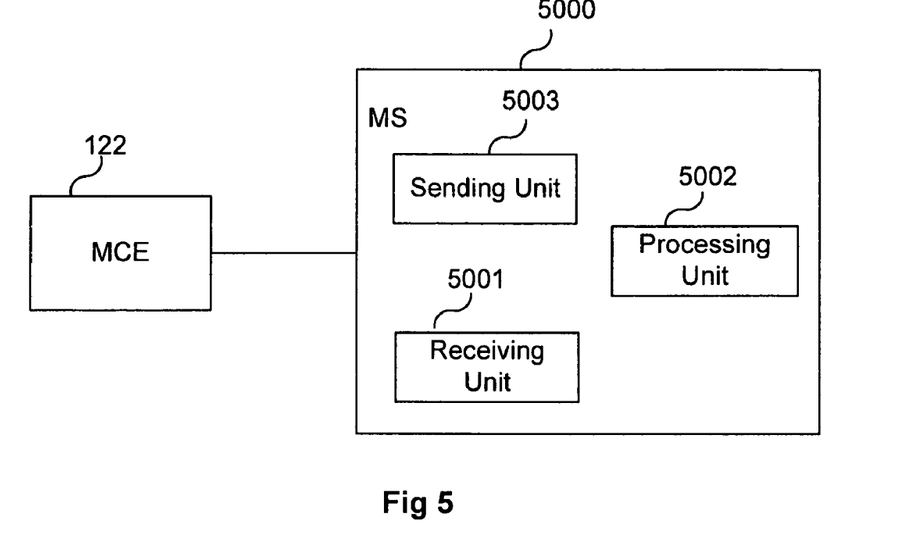
FIG. 5 is a block diagram depicting a mobile terminal in accordance with the teachings of the present invention.
Figure 6:
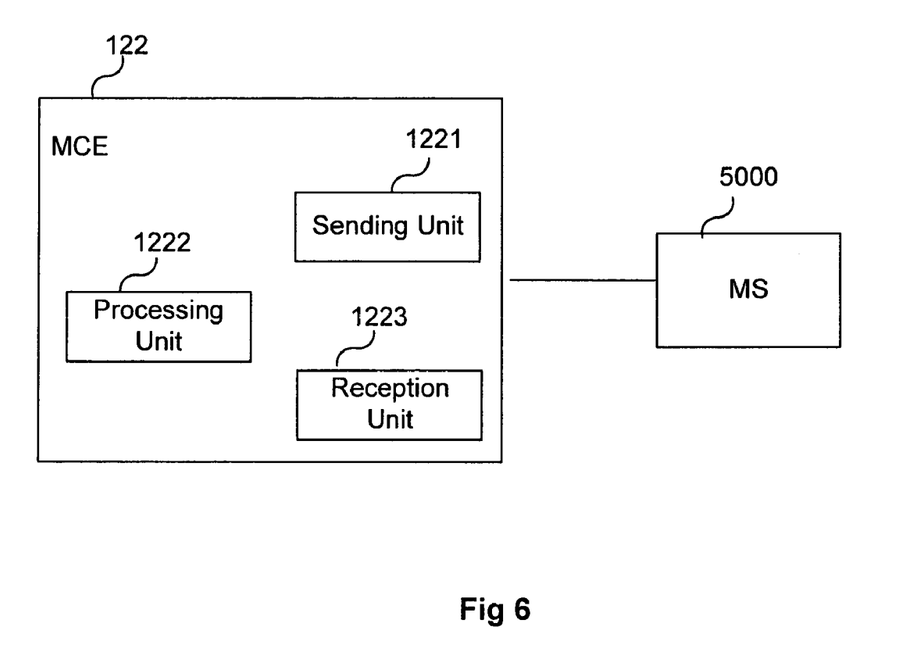
FIG. 6 is a block diagram depicting a network node in accordance with the teachings of the present invention.

The method depicted in FIG. 4 may be performed using a processing entity controlling a radio access network, such as the multicast control entity 122 depicted in FIGS. 1, 5, and 6.

As will be described in more detail below, the method depicted in FIG. 4 involves the reception of signal and/or interference level reports from one or more mobile stations within the coverage area of the radio access network. The processing entity may be e.g. the MCE according to the evolution of the UTRAN. Based on the received reports the processing entity performs a configuration of a set of cells to form at least one single frequency network. The configuration of the set of cells comprises an adding and/or a removing of cells of the single frequency based on varying radio conditions measured by the mobile stations as they move. The varying radio conditions are reported to the processing entry and considered in the decision to add or remove cells from the single frequency network. On a general level, the selection of the set of cells to be included in a SFN is a tradeoff between the increase of a signal and interference relation which is gained when including a cell into the SFN and the radio resource consumption associated with utilizing the cell. As more cells are included into an SFN, the receivable signal level will improve at the cost of the usage of radio resources of the cells included in SFN, which are not available for other purposes. Also in some cases the combination of a set of cells to form a single frequency network can be less efficient from a perspective of radio resource utilization than providing service in a point to point transmissions or point to multipoint transmissions within the cells that are not configured to form a single frequency network.

The below described method aims to consider these aspects to efficiently configure a single frequency network.

The method starts with an initial step 504 in that the MCE sends requests to the mobile stations within the MBMS service area to provide measurement reports to the MCE.

Continuing with step 505 and in response to this request one or more mobile stations within the MBMS service area submit measurement reports comprising at least an indication of the signal level received from the various cells from that a signal can be received. In a particular embodiment, each mobile station determines the cell from which the received signal strength of the pilot signal has a maximum and the report comprises an indication of this cell providing the maximum signal level. Alternatively or in addition the reports from the mobile stations include one or more modulation and coding schemes which are selectable in view of a signal/and or interference level at the mobile stations.

Continuing with step 506 the MCE receives the reports provided by the mobile stations and considers the reports to compose an initial set of cells to be included in the single frequency network in step 507. Advantageously the initial set of cells includes the cells from which a maximum signal level or a favourable signal to interference relation, in particular a maximum signal to interference ratio, has been received at the mobile stations.

According to an alternative embodiment the forming of a SFN is preceded by a checking step to determine, whether a SFN should be formed. To that end the estimated radio resource consumption needed to serve the mobile stations according to a SFN mode of transmission can be compared with the estimated radio resource consumption that would be needed to serve the same mobile stations in a unicast mode of transmission. If the estimated radio resource consumption in unicast transmission mode exceeds the estimated radio resource consumption in SFN transmission mode no SFN is formed. In the other case a SFN is formed.

A measure for the estimated radio resource consumption in that context can be the achievable transmission rate in the respective mode of transmission. E.g. a criterion can be if the average achievable transmission in SFN mode of transmission is above the achievable unicast transmission rate, a SFN is formed.

Alternatively, the criterion can be if the achievable transmission in SFN mode of transmission is above the minimum achievable unicast transmission rate, a SFN is formed.

The method continues with step 508, in that the MCE either considers the reported signal and interference level contributions or the selectable modulation and coding schemes reported by the mobile stations to determine a set of modulation and coding schemes that are selectable for a single frequency network to be composed.

Subsequently the MCE determines for the set of modulation and coding schemes selectable for the single frequency network to be composed, associated transmission rates and, selects in step 509 a MCS (modulation and coding scheme) with that a maximum transmission rate is associated.

Subsequently the MCE establishes the SFN and the selected MCS and associated transmission rate and indicates the establishment of the SFN and the selected transmission rate towards the mobile stations to be served by the SFN.

Subsequently a measurement period starts at step 511, in that the mobile stations served by the SFN periodically measure signals from candidate cells and report results from the signal measurements to the MCE.

Continuing with step 512 an initial set of cells of the SFN is formed. Advantageously this initial set of cells comprises those cells within the SFN for that the signal level is a maximum. For this initial SFN a maximum transmission rate is determined based on previously received measurement reports.

In a subsequent step 513 a next cell to be included in the SFN is determined. To that end a maximum transmission rate that would be achievable by the mobile stations to be served if the cell would be included in the set of cells of the MFS is determined for a plurality of candidate cells. Among the candidate cells a cell for that the transmission rate is a maximum is selected.

Continuing with step 514, an expected radio resource consumption associated with including the candidate cell into the set of cells of the SFN is determined. The resource consumption may consider applying a certain modulation and coding scheme for a transmission within the cell. As an example a unicast transmission rate achievable when employing the modulation and coding scheme for a unicast transmission within the candidate cell may be determined and used as an indication for the radio resource consumption associated with including the candidate cell into the set of cells.

In a subsequent step 515 a checking is performed to determine, whether the expected radio resource consumption determined in step 514 exceeds a predefined stop criterion. If, for example the achievable unicast transmission rate is used as indication of the radio resource consumption, the achievable unicast transmission rate can be set in relation to the transmission rate determined in step 514 for the SFN mode of transmission. More specifically, the expected increase in the transmission rate achievable when including the selected cell and applying a SFN mode of transmission can be determined. The predefined stop criterion could then be that the achievable unicast transmission rate is larger than the expected increase of the transmission rate in SFN mode multiplied by the number of mobile stations that can be served. An alternative stop criterion for including more cells into the set of cells of SFN could be whether a predefined target transmission rate is matched.

If the result of the checking step 515 is to the positive, i.e. is the radio resource consumption does not exceed the predefined stop criterion, the method continues with including the candidate cell into the set of cells of the SFN according to step 516 and further with selecting a next cell to be included in the set of cells of the SFN according to step 513.

If the result of the checking step 515 is to the negative i.e. is the radio resource consumption exceeds the predefined stop criterion, the method of determining the set of cells for the SFN 500 is concluded with step 517 with regard to the currently available measurement reports. The current set of cells and the selected modulation and coding scheme are indicated towards the mobile stations served by the SFN.

The configuration of the SFN is resumed with step 511, when a new set of measurement reports is available.

FIG. 5 depicts a mobile terminal 5000 connectable to the MCE (multicast control entity) 122 of FIG. 1. The mobile terminal 5000 enables composing of a set of a cells within a coverage area of a radio access network within which the same information is transmitted time synchronously using a modulation and coding scheme common for the cells of the set. The mobile terminal comprises a receiving unit 5001 for receiving one or more pilot signals from respective one or more cells monitored by the mobile station. Furthermore the mobile terminal 500 comprises a processing unit 5002 for processing the measurements from the received pilot signals. According to one embodiment of the invention the processing unit 5002 is adapted to determine signal and interference contributions from the one or more monitored cells if the monitored cell were included within the set of cells. Furthermore the mobile station comprises a sending unit 5003 for sending processing results, advantageously to the MCE 122. According to one embodiment of the invention sending processing results comprises indicating the determined signal and interference contributions towards a network node performing the composition of the set of cells.

According to an another embodiment of the invention the processing unit 5002 is adapted to determine signal and interference levels from the one or more monitored cells if a signal would be transmitted time synchronously using a common modulation and coding scheme within cells of a candidate set of and to determine one or more modulation and coding schemes selectable with regard to the determined signal and interference levels and the candidate set of cells. According to this embodiment the sending unit 5003 is adapted to indicate the one or more determined selectable modulation and coding schemes towards a network node performing the composition of the set of cells. The network performing the composition of the set of cells can be for example the MCE 122 of FIG. 1.

FIG. 6 depicts a network node 122 for composing a set of a cells within which the same information is transmitted time synchronously using a modulation and coding scheme common for the cells of the set. The network node could serve as a MCE (multicast control entity) 122 as depicted in FIG. 1. The network node 122 comprises a processing unit 1222 for determining an initial set of cells to be comprised within the set of cells to be composed. The network further comprises a reception unit 1223 for receiving measurement results from one or more mobile stations such as the mobile station 5000 of FIG. 5. According to one embodiment the measurement results comprise a signal and interference contribution from one or more cells monitored at the one or more mobile stations. The network node 122 further comprises a processing unit for processing the measurement results to create a modified set of cells. According to one embodiment of the invention the processing unit is adapted to select one or more cells to be added or removed from the initial set in view of a contribution to a signal and interference level, and to create a modified set of cells using the initial set and the selected one or more cells.

According to another embodiment of the invention the measurement results comprise selectable modulation and coding schemes if a signal would be transmitted time synchronously using a common modulation and coding scheme within cells of a candidate set of cells. According to this embodiment the processing unit 1222 is adapted to select one or more cells to be added or removed from the initial set depending on the received one or more modulation and coding schemes and to create a modified set of cells using the initial set and the selected one or more cells.

Furthermore the network node comprises a sending unit 1221 for sending one or more signals indicating the modified set of cells.

The invention claimed is:

1. A method for enabling a composing of a set of cells within a coverage area of a radio access network within which the same information is transmitted time synchronously using a modulation and coding scheme common for the cells of the set, the method comprising the steps performed by a mobile station connectable to the radio access network:
    identifying one or more pilot signals from respective one or more cells monitored by the mobile station;
    determining signal and interference contributions from the one or more monitored cells with regard to a particular set of cells; and
    reporting the determined signal and interference contributions towards a network node performing the composition of the set of cells.

2. The method according to claim 1 comprising the further steps performed by the mobile station of:
    identifying a set of one or more of cells from which pilot signals are receivable, selecting subset from the set of cells from which pilot signals are receivable according to the signal and/or interference contributions from the cells of the subset, and
    selectively reporting the signal and interference contributions for the subset.

3. The method according claim 1, comprising the further steps performed by the mobile station of:
    receiving one or more indications indicating whether cells have been included in the set of cells to be composed,
    selecting one or more cells potentially included into the set to be composed in view an expected contribution to the signal and/or interference level received in the mobile station if the one or more cells were included into the set; and
    selectively reporting signal and interference contributions of the selected one or more cells.

4. The method according to claim 1, comprising the further steps performed by the mobile station of:
    receiving one or more indications indicating whether cells have been included in the set of cells to be composed;
    selecting one or more cells potentially removed from the set to be composed in view of an expected signal and/or interference level received in the mobile station that would result if the one or more cells were removed from the set, and
    selectively reporting signal and interference contributions of the selected one or more cells.

5. The method according to claim 1, further comprising the further steps:
    receiving an indication of the number of cells for which the signal and interference contributions should be reported, and
    considering the indicated number of cells when reporting the signal and interference contributions.

6. A method for composing a set of cells within which the same information is transmitted time synchronously using a modulation and coding scheme common for the cells of the set, the method comprising the steps of:
    determining an initial set of cells to be comprised within the set of cells to be composed;
    receiving from one or more mobile stations an indication of a signal and interference contribution from one or more cells monitored at the one or more mobile stations;
    selecting one or more cells to be added or removed from the initial set in view of a contribution to a signal and interference level; and
    creating a modified set of cells using the initial set and the selected one or more cells.

7. The method for composing a set of cells according to claim 6, comprising the further step of initiating a sending of one or more indications indicating whether cells have been included in the set of cells to be composed.

8. The method according to claim 6, comprising the further steps of:
- determining a resource consumption associated with including a particular cell into the set of cells; and
- deciding whether to include the particular cell into the set of cells or not depending on the determined resource consumption.

9. The method for composing a set of cells within which the same information is transmitted time synchronously using a modulation and coding scheme common for the cells of the set, the method comprising the steps of:
- determining an initial set of cells to be comprised within the set of cells to be composed;
- receiving from at least one mobile station one or more selectable modulation and coding schemes if a signal would be transmitted time synchronously using a common modulation and coding scheme within cells of a candidate set of cells;
- selecting one or more cells to be added or removed from the initial set depending on the received one or more modulation and coding schemes; and
- creating a modified set of cells using the initial set and the selected one or more cells.

10. The method according to claim 9, further comprising determining a preferred candidate set of cells and sending one or more indications of the cells of the preferred candidate set of cells towards the at least one mobile station.

11. The method according to claim 9, comprising receiving one or more indications of the cells of the candidate set of cells from the at least one mobile station.

12. A mobile terminal for enabling a composing of a set of a cells within a coverage area of a radio access network within which the same information is transmitted time synchronously using a modulation and coding scheme common for the cells of the set, the mobile terminal comprising:
- a receiving unit for receiving one or more pilot signals from respective one or more cells monitored by the mobile station;
- a processing unit for determining signal and interference contributions from the one or more monitored cells if the monitored cell were included within the set of cells; and
- a sending unit for indicating the determined signal and interference contributions towards a network node performing the composition of the set of cells.

13. A network node for composing a set of cells within which the same information is transmitted time synchronously using a modulation and coding scheme common for the cells of the set, the network node comprising:
- a processing unit for determining an initial set of cells to be comprised within the set of cells to be composed;
- a reception unit for receiving from one or more mobile stations a signal and interference contribution from one or more cells monitored at the one or more mobile stations, wherein the processing unit is adapted to select one or more cells to be added or removed from the initial set in view of a contribution to a signal and interference level, and to create a modified set of cells using the initial set and the selected one or more cells.

* * * * *

UNITED STATES PATENT AND TRADEMARK OFFICE
CERTIFICATE OF CORRECTION

PATENT NO.         : 8,254,280 B2                                   Page 1 of 1
APPLICATION NO.    : 12/526582
DATED              : August 28, 2012
INVENTOR(S)        : Huschke et al.

It is certified that error appears in the above-identified patent and that said Letters Patent is hereby corrected as shown below:

On the Title Page, in Item (73), under "Assignee", in Column 1, Line 1,
delete "Telefonatiebolaget" and insert -- Telefonaktiebolaget --, therefor.

In Column 6, Line 61, delete "entry" and insert -- entity --, therefor.

In Column 10, Line 21, in Claim 3, delete "according" and insert -- according to --, therefor.

Signed and Sealed this
Thirteenth Day of November, 2012

David J. Kappos
*Director of the United States Patent and Trademark Office*